United States Patent [19]
Poon et al.

[11] Patent Number: 5,940,438
[45] Date of Patent: Aug. 17, 1999

[54] UNIVERSAL MODEM FOR DIGITAL VIDEO, AUDIO AND DATA COMMUNICATIONS

[75] Inventors: Tommy C. Poon, Murray Hill; Jay Bao, Bridgewater, both of N.J.; Yoshiki Mizutani, Takarazuka; Hiroyuki Nakayama, Kyoto, both of Japan

[73] Assignee: Mitsubishi Electric Information Technology Center America, Inc (ITA), Cambridge, Mass.

[21] Appl. No.: 08/801,748

[22] Filed: Feb. 18, 1997

[51] Int. Cl.[6] .................... H04B 1/38; H01L 5/16; H01L 27/10; H01L 27/18

[52] U.S. Cl. .................... 375/222; 375/223; 375/219; 375/220; 379/93.01; 379/93.09

[58] Field of Search .................... 375/222, 223, 375/219, 220; 379/93.01, 93.09

[56] References Cited

U.S. PATENT DOCUMENTS

| | | | |
|---|---|---|---|
| 5,349,635 | 9/1994 | Scott | 379/97 |
| 5,367,563 | 11/1994 | Sainton | 379/98 |
| 5,550,881 | 8/1996 | Sridhar et al. | 375/377 |
| 5,577,087 | 11/1996 | Furuya | 375/377 |
| 5,602,868 | 2/1997 | Wilson | 375/219 |
| 5,655,003 | 8/1997 | Erving et al. | 379/418 |
| 5,671,253 | 9/1997 | Stewart | 375/316 |
| 5,717,471 | 2/1998 | Stewart | 348/726 |

*Primary Examiner*—Stephen Chin
*Assistant Examiner*—Michael W. Maddox
*Attorney, Agent, or Firm*—Dirk Brinkman

[57] ABSTRACT

A universal modem has a software-configurable modulator/demodulator which accommodates different modulation formats such as those associated with terrestrial, cable, phone line, satellite and wireless communications to be transmitted and received through a single device in which the modem has reconfigurable logic to accommodate the format of the signals being received or transmitted. Note that the modulator or demodulator can be used separately or the two units can be combined and used for transceivers, with either the same software configuring both the modulator and demodulator, or with different software used for the two units. In the receive mode, the universal modem detects the modulation format of the incoming signal and reconfigures the logic of its software-configurable demodulator to output demodulated digital data for further processing. In the transmit mode, information to be transmitted is provided with the appropriate modulation format by setting a software-configurable modulator in the universal modem to the particular format. In one embodiment, in the receive mode the incoming signal is A–D converted, with a host processor utilized to detect the type of modulation associated with the incoming signal and through a configuration controller configures a random access memory which is coupled to the software-configurable demodulator. In advanced television applications, the demodulated signal is passed through an equalizer, a Trellis Decoder and Reed-Solomon Decoder to provide an appropriate filtered and level-adjusted digital signal that is coupled to the next processing stage.

18 Claims, 7 Drawing Sheets

84

$$x(n) = I(n)\cos\theta(n-1) - Q(n)\sin\theta(n-1)$$

$$y(n) = I(n)\sin\theta(n-1) + Q(n)\cos\theta(n-1)$$

$$X(n) = \sum_{i=0}^{m-1} C_i \cdot x(n-i)$$

$$Y(n) = \sum_{i=0}^{m-1} C_i \cdot y(n-i)$$

$$\Delta\theta(n) = \tan^{-1}\left(\frac{Y(n)}{X(n)}\right) - E\left\{\tan^{-1}\left(\frac{Y(n)}{X(n)}\right)\right\}$$

$$\theta(n) = f(\Delta\theta(n))$$

$f$: LOOP TRANSFER FUNCTION $$ex.)\ \ f(\theta_i) = -\sum_{k=-\infty}^{i}\theta_k$$

$I(n), Q(n)$: DATA INPUT FROM A/D CONVERTER
  AT THE TIME $nT$ ($T$ = SAMPLING PERIOD)
$C_i$: COEFFICIENTS OF ROLLOFF FILTER.
  ($0 \leq i < m$)
$m$: NUMBER OF TAPS OF ROLLOFF FILTER.
$E\{\ \}$: FORECAST OF IDEAL ANGLE.

*FIG. 9*

UNIVERSAL MODEM FOR DIGITAL VIDEO, AUDIO AND DATA COMMUNICATIONS

FIELD OF INVENTION

This invention relates to modulators and demodulators and, more particularly, to a universal modem which is configurable to process one of a number of modulation formats.

BACKGROUND OF INVENTION

In recent years due to the rapid development of multimedia, digital, audio and video communication applications, there is a necessity for efficient and reliable signal modulation and demodulation techniques to accommodate different modulation formats chosen based on the media over which the signals are to be transmitted.

For instance, with respect to high definition television, and in fact other types of advanced television transmissions, program material in video, data or audio form is formatted by a channel encoder so as to be transmittable by Vestigial Side Band modulation or VSB which is typical for over-the-air television transmissions. On the other hand, Quadrature Amplitude Modulation or QAM is typically used for cable transmission, whereas Quadrature Phase Shift Keying or QPSK is generally used in satellite communication. Finally, discrete multitone or DMT techniques are typically used for telephone landline signalling such as with Asymmetric Digital Subscriber Lines or ADSL.

It will be appreciated that when a video source at the transmit side is encoded through a source coding unit, the source coding unit is set up to code the video source material in one of the four above-mentioned modulation formats. Likewise, on the receive side, in order for a receiver to decode all of the above-mentioned formats discrete VLSI chips or detectors can be provided in parallel, with the outputs going to source decoding. It will be readily apparent that because there is presently no universal modulation format, receivers destined to be utilized not only for over-the-air transmissions, but also for cable must at least have the capability of decoding the appropriate modulation format. While it is possible to use a parallel brute force approach by merely providing the receive side with a series of demodulators each configured to demodulate a particular format, this approach is costly and error-prone.

As to the parallel approach mentioned above, it is possible to design a modem in which the input signal is fed from the RF-IF stage of the receiver in parallel to each of four demodulators, with the output of each demodulator being switched to source decoding depending on the modulation format of the received signal. Modulation format can be determined in some instances by the channel to which the receiver is tuned, although this can vary from country to country.

For instance, in the United States, for VHF channels 1–13 and UHF channels, VSB modulation is used, with the VSB demodulator switched to source decoding. For the cable channels, generally over Channel 68, QAM modulation is used, with the output of the QAM demodulator switched to source decoding. For satellite channels, QPSK modulation is used, with the QPSK demodulator switched to source decoding, whereas for telephone line usage, assuming a channel indicating landline transmission, it is the DMT output of a demodulator which is switched to source decoding.

This duplication of demodulators aside from being four times the expense of a single demodulator, also has the following problems: First and foremost, it will be appreciated that in order to switch the outputs of the various demodulators to source decoding, the output of the demodulators must have a high impedance to damp switching transients and like anomalies. Secondly, care must taken to eliminate cross modulation between the different demodulators.

It will thus be appreciated that any parallel processing solution to the problem of multiple modulation formats generally resolves itself into a question of the cost associated with duplicating demodulators and technical complexity which is indeed a factor in mass marketed multimedia receivers for which such demodulator cost duplication and complexity is unacceptable.

On the transmit side, for multimedia transmissions requiring different modulation formats, duplicating modulators are likewise expensive and error-prone in much the same way as described above with respect to demodulators. Also, with specialty services such as data to be provided on different channels, oftentimes the modulation format is different from that of the main transmission. To provide such additional services ordinarily would require separate modulators having the expected cost impact.

SUMMARY OF THE INVENTION

Rather than multiplying the number of demodulators and modulators to be able to demodulate the differing modulation formats and to provide for differing modulation formats, in the subject invention, a universal modem is provided which is based on reconfigurable logic for its demodulator as well as its modulator. In one embodiment, a host computer at the receive side detects the modulation type and reconfigures the demodulator in universal modem to demodulate the format of the incoming signal.

In this embodiment in the receive mode, a host computer detects the modulation type of the incoming signal by detecting the channel to which the receiver is tuned and setting the demodulator to the expected format. Thus if the receiver is tuned to a given channel, then the universal modem is reconfigured to the expected format of signals on that channel. This is done on an a priori basis since different groups of channels have different standardized formats.

Alternatively, the host computer can detect the format of the incoming signal by detecting a flag in the header of the incoming data stream indicating modulation type, assuming one is loaded into the header at the transmit side. This type of demodulation selection does not require a priori knowledge of the correlation of channel with modulation type. As will be appreciated, in different countries different channels are assigned to different types of service which makes this alternative method of ascertaining the channel modulation type attractive. The above, of course, requires that a modulation type flag be generated in the source coding at the transmit side.

In one example of the use of the universal modem in the ATV or advanced television transmission mode, assume that video data is to be transmitted in the MPEG format, where MPEG stands for Motion Picture Expert Group and where one utilizes the MPEG-2 format currently in vogue. Video information is source coded in MPEG in which 188 bytes of information are transmitted as a packet. Channel coding which defines the modulation format is imposed on top of the source coding to provide error correction which adds typically 20 more bytes of information to the data stream.

After the video information has been source coded and channel coded by the software-configurable modulator for a given format, it is ready for transmission. Note that prior to the transmission of the data, a header, e.g. a 3-bit header word: 000=VSB, 001=QAM, 010=QPSK, 011=DMT etc., can be inserted into the channel coding so as to provide an indication of the modulation type.

While the above has been described in terms of standardized formats for terrestrial, cable, satellite or telephone communications, the universal modem is also applicable to such diverse areas as cellular, PCS and other wireless services to provide automatic reconfiguring of a transceiver to permit its use across different formats. This is especially useful with cellular phone formats CDPD, CDMA, TDMA, FDMA and GSM referring respectively to cellular digital packet data, code division multiplexing, time-division multiplexing, frequency-division multiplexing, and the global mobile system type of modulation. While a cellular phone may be provided in one community for use with CDMA, when the phone roams to an area where TDMA transmissions are utilized, a universal modem within the phone can detect the change and reconfigure the demodulator side of the modem. Likewise, since the cellular system is a full duplex system, the universal modem can be reconfigured in the transmit mode to appropriately format the cellular transmission. It will of course be appreciated that the universal modem can be used with any type of RF transceiver roaming from one area to another where different formats are used, regardless of the type of service that is authorized.

Further, the universal modem is applicable to any kind of digital modulation method. For instance, it can be applied to digital terrestrial broadcasting utilizing the OFDM or Orthogonal Frequency Division Multiplexing method scheduled for use in Europe, Japan and/or other countries.

In one embodiment, the demodulation section of the modem, involves an analog-to-digital converter to provide a digital bit stream to a demodulator which is software-reconfigured in accordance with the output of a configuration RAM. In this embodiment, circuit blocks, elements or modules within the demodulator are linked up to provide a particular type of carrier recovery in accordance with the output of the configuration RAM. In another embodiment, the demodulator is layered, with each layer containing a different carrier recovery circuit. The configuration RAM can call for a given type of demodulation merely by activating one of the layers. This means that in any event, the configuration of the demodulator can be fixed by providing it with blocks, elements or modules that are connected in a particular way on the fly in response to the output of a configuration RAM under the control of a configuration controller. In a further embodiment, the software-configurable demodulator can be implemented in software using a general purpose microprocessor. Note that the above software reconfiguration techniques utilized for the demodulator can likewise be used for a software-configurable modulator.

For over-the-air and cable signals requiring equalization, the output of the configuration RAM may also be utilized to reconfigure an equalizer coupled to the output of the demodulator. Alternatively, when no follow-on signal processing is required, the only element that is to be reconfigured is the demodulator. It will be noted that equalizers are in general used to correct intersymbol interference, whereas in television applications, equalizers are used to cancel ghost images.

As to setting of the universal modem for modulation type or format as mentioned before, flags can be used on the transmission which are detected at the receive side. Alternatively, the channel to which the receiver is tuned can be detected. Moreover, a smart card or other similar device can be used to set the modulation type or format at the receive side. An additional way of detecting modulation type is to demodulate an incoming data stream using all possible formats, detecting the error and setting the demodulator to the modulation type having the lowest error.

In summary, a universal modem has a software-configurable modulator/demodulator which accommodates different modulation formats such as those associated with terrestrial, cable, phone line, satellite and wireless communications to be transmitted and received through a single device in which the modem has reconfigurable logic to accommodate the format of the signals being received or transmitted. Note that the modulator or demodulator can be used separately or the two units can be combined and used for transceivers, with either the same software configuring both the modulator and demodulator, or with different software used for the two units. In the receive mode, the universal modem detects the modulation format of the incoming signal and reconfigures the logic of its software-configurable demodulator to output demodulated digital data for further processing. In the transmit mode, information to be transmitted is provided with the appropriate modulation format by setting a software-configurable modulator in the universal modem to the particular format. In one embodiment, in the receive mode the incoming signal is A–D converted, with a host processor utilized to detect the type of modulation associated with the incoming signal and through a configuration controller configures a random access memory which is coupled to the software-configurable demodulator. In advanced television applications, the demodulated signal is passed through an equalizer, a Trellis Decoder and Reed-Solomon Decoder to provide an appropriate filtered and level-adjusted digital signal that is coupled to the next processing stage.

BRIEF DESCRIPTION OF THE DRAWINGS

These and other features of the subject invention will be better understood taken in conjunction with the Detailed Description in conjunction with the Drawings of which:

FIG. 9 is an algorithm for the demodulation of QPSK/QAM which can be broken into elements and used for the demodulator of FIG. 5A;

DETAILED DESCRIPTION

Figure 1:
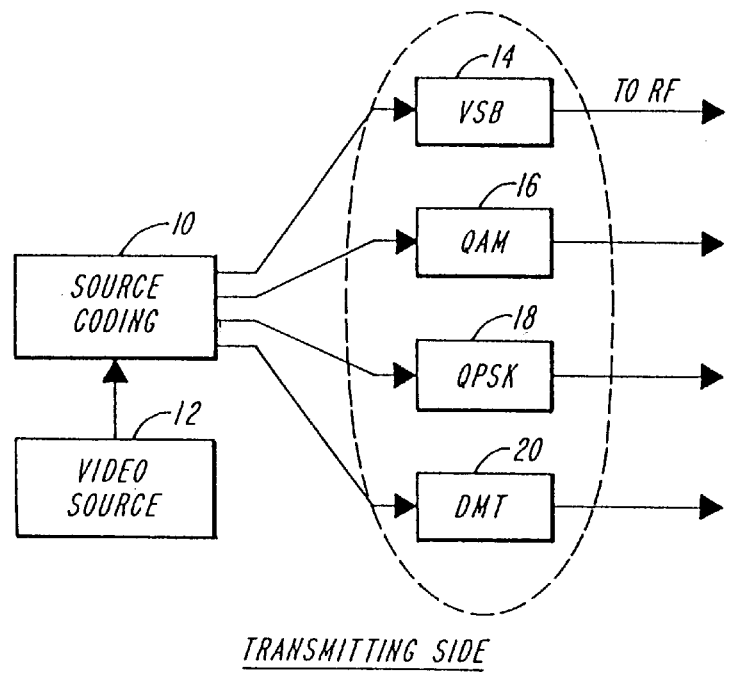
FIG. 1 is a block diagram of the transmit side of a modem indicating the utilization of multiple discrete modulators.
Figure 2:
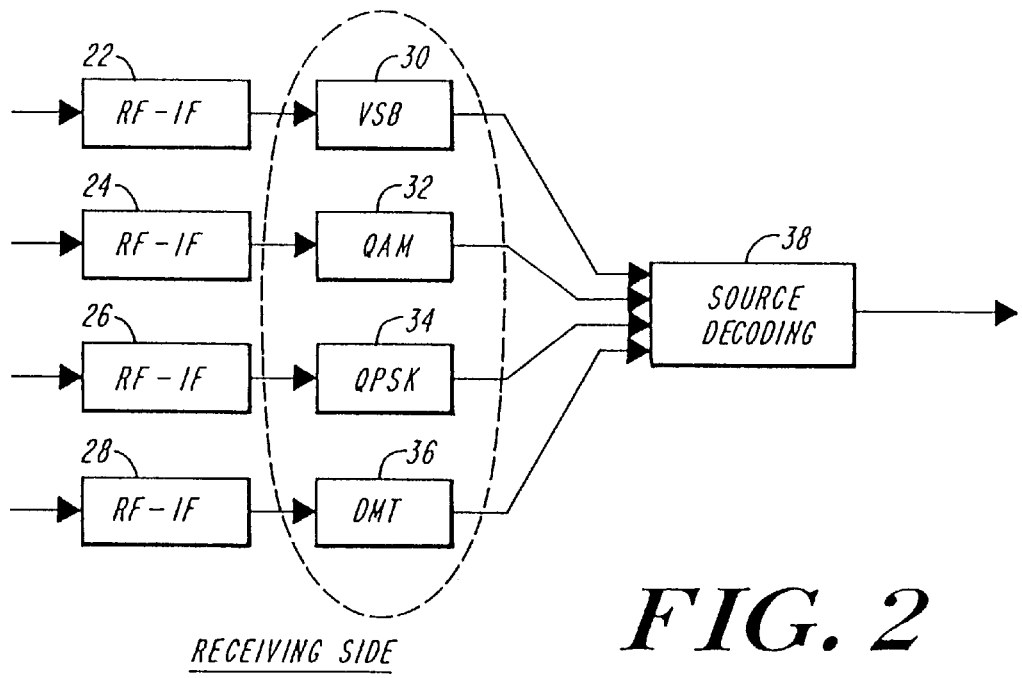
FIG. 2 is a block diagram of the receive side of the modem of FIG. 1 indicating the utilization of multiple demodulators coupled to source decoding, in which the demodulator corresponding to the format of the input signal is switched to source decoding.

As mentioned above, the rapid deployment of multimedia, digital, audio and visual communication applications calls for efficient and reliable signal modulation and demodulation methods. As illustrated in FIGS. 1 and 2, signals transmitted via different media are modulated and demodulated differently. For instance, on the transmit side, source coding 10 takes video content from a video source 12 and encodes it into bit streams, whereupon the output of source coding unit 10 is applied in parallel to modulators 14, 16, 18 and 20 respectively VSB, QAM, QPSK and DMT modulators. The formats for VSB, QAM, and QPSK modulation techniques are described in K. Blair Benson, Television Engineering Handbook, Revised Edition, McGraw-Hill, 1992. The format for DMT is described in Bellcore, Framework Generic Requirements for Asymmetric Digital Subscriber Lines, FA-NWT-001397, No. 1, December, 1992 and in "Notice to the Industry: ADSL Equipment", Bellcore Digest of Technical Information, June, 1993, p. 40.

The decision as to which modulation technique is to be utilized in, for instance, terrestrial over-the-air signalling or cable signalling, is founded in both political and technical considerations. Historically, VSB was the format originally used to transmit over-the-air video signals. In the early days of television, Vestigial Side Band Modulation was deemed to be the most efficient modulation method, whereas, with respect to cable, Quadrature Amplitude Modulation gave superior performance. Regardless of the modulation format, there exist numerous modulation schemes which must be accommodated by a universal modem.

On the receive side, as illustrated in FIG. 2, in a parallel processing scheme an incoming signal is down converted by RF-IF converters, here illustrated by reference characters 22, 24, 26, and 28, coupled to respective demodulators 30, 32, 34 and 36. For ATV receivers, the VSB and QAM modulators are available from major television manufacturers, as well as being under development in a joint development program between Mitsubishi Electronics America and Lucent Technologies, Inc. QPSK demodulators are available from Philips Semiconductors, Part No. TDA8040T, among others. DMT-based ADSL equipment is described in "Notice to the Industry: ADSL Equipment", Bellcore Digest of Technical Information, June, 1993, p. 40. As mentioned hereinbefore, the outputs of these demodulators are switched to a source decoding unit 38, such as the Mitsubishi MH-1000D.

The problem associated with multiple formats is that the number of modulation schemes now contemplated for use and in the future, are multiplying. Presently, there is no way of ascertaining which modulation schemes will dominate. It is therefore encumbant on the manufacturer of transceivers to be able to accommodate as many modulation schemes as possible with a minimum amount of hardware.

Figure 3:
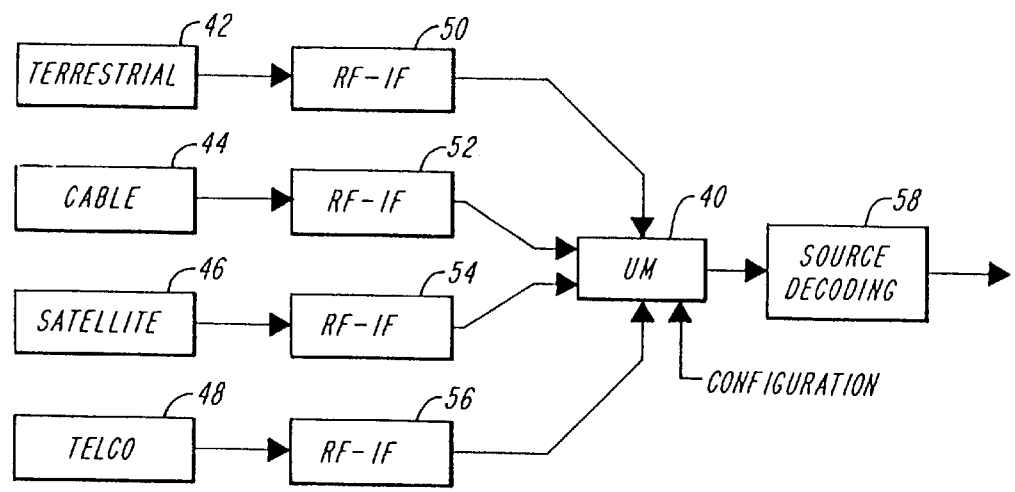
FIG. 3 is a block diagram of the receive side of the subject universal modem indicating multiple inputs of differing formats, with the universal modem detecting which format the incoming signal possesses and then internally reconfiguring itself.

Referring now to FIG. 3 in the subject system on the receive side, a universal modem 40 which is software-reconfigurable has as an input either a terrestrial signal 42, a cable signal 44, a satellite signal 46 or a landline signal 48, each with its own unique modulation format. Here the signals are coupled to respective RF-IF converters 50, 52, 54 and 56. The output of the universal modulator is in turn coupled to conventional source decoding 58.

As will be discussed in FIG. 5A, the universal modem is reconfigurable depending either on the channel to which the receiver is tuned, or on detection of format flags. The universal modem is thus provided with configuration control signals derived either through a priori knowledge of the modulation type associated with a channel or actual detection of format flags.

Figure 4:
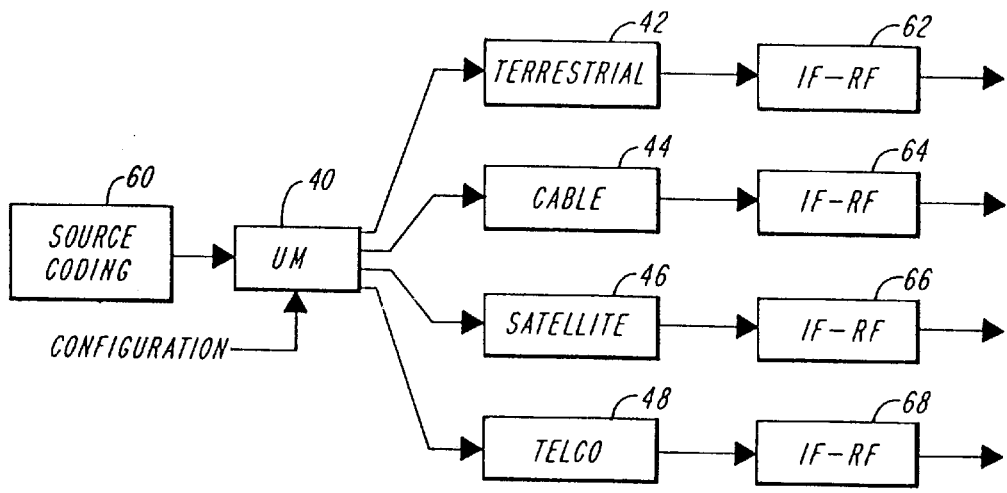
FIG. 4 is a block diagram of the transmit side for the subject universal modem in which the universal modem is utilized to encode signals in accordance with the intended modulation mode of the signal.

Referring now to FIG. 4, on the transmit side of the universal modem, source coding 60 is coupled to universal modem 40 which in turn configures the modulator in the modem to output bit streams having the required modulation format dependent on the media, namely, terrestrial 42, cable 44, satellite 46 and landline 48. Here, the modulator is software-configurable, which eliminates the requirement for a plurality of modulators. It will thus be appreciated that modem 40 reformats the program material or video source from source coding 60 so as to put the material into a modulation format which is compatible with the particular medium over which the information is to be transmitted. In general, modem 40 performs function of channel coding, with the channel dictating the particular modulation format. As can be seen, the output of modem 40 is provided to that IF-RF converter 62, 64, 66 and 68 required for the associated media.

There are several advantages of having a software reconfigurable modulator:

First, when used in multimedia applications, the role of the universal modem is of a network interface module. In addition to having the capability of receiving from multiple transmission media applying different modulations, it allows the user to send signals, such as request for data or audio/video services, via different return channels having different modulation platforms. This not only increases the flexibility and mobility of the device, it also benefits the optimization of return channel bandwidth and utilization efficiency.

Secondly, when used in broadcast services, the universal modem provides a low cost modulation platform which can be changed under software control from one modulation format to another. This benefits regional stations which typically have a small number of channels to provide service with, but obtain their programs from more than one service provider and network involving multiple modulation types.

Thirdly, the advantages for PCS referred to hereinabove include the ability to instantly switch from one format to another when roaming, depending on the area the cell phone is in, thus to switch from TDMA to CDMA and vice versa as an example. Note that the CDMA system is described in U.S. Pat. No. 5,103,459 entitled SYSTEM AND METHOD FOR GENERATING SIGNAL WAVE FORMS IN A CDMA CELLULAR TELEPHONE SYSTEM.

Figure 5A:
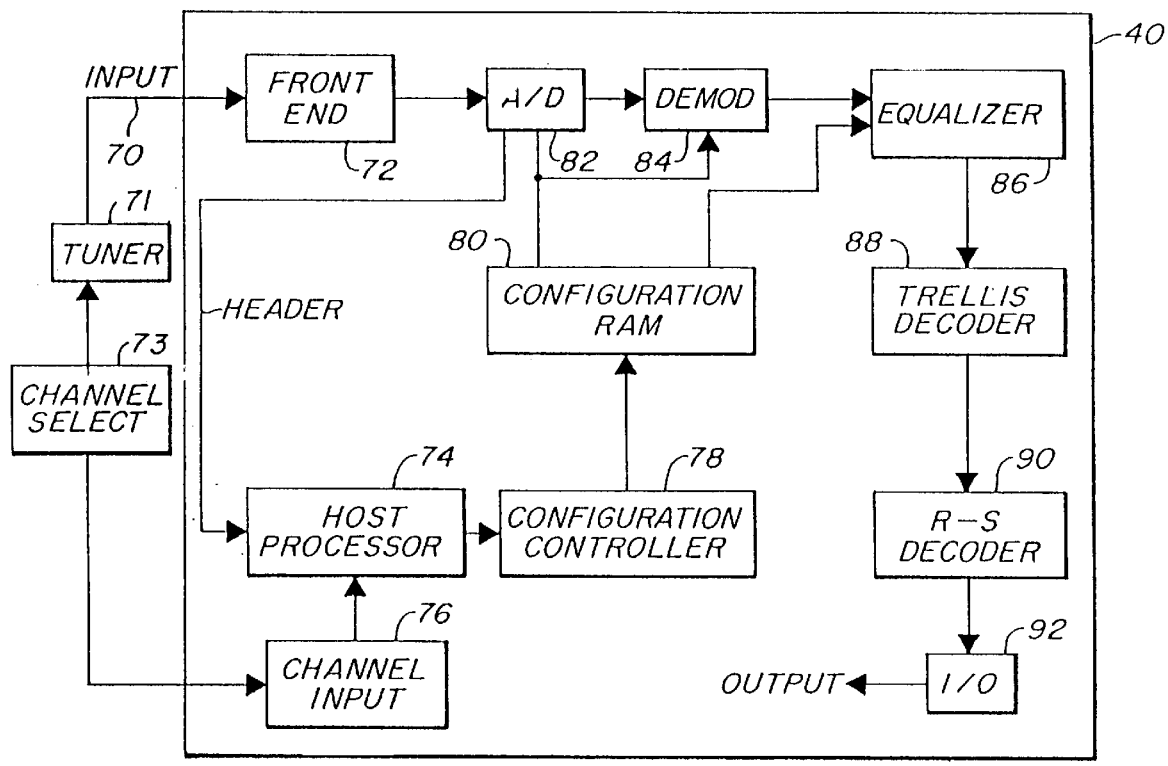
FIG. 5A is a block diagram of one embodiment of the receive side of the subject universal modem indicating the utilization of a configuration controller, configuration RAM and a configurable demodulator in combination with an equalizer, a Trellis Decoder, and an R-S Decoder.

Referring now to FIG. 5A, in one embodiment, the receive side of the universal modem includes an input 70 from tuner 71 which is coupled to a front end 72 whose primary purpose is level adjustment, amplification and filtering of the incoming signals from the tuner. Note that the tuner is set to a given channel by channel select 73. The output of front end 72 is coupled to A–D converter 82, and thence to software-configurable demodulator 84. Additionally, in one embodiment, the header of the input signal is stripped off and provided to a host processor 74 which determines from flags in the header the modulation format type. Alternatively, the host processor can determine the modulation format through channel input 76 from the channel select 73. In either event, the output of the host processor specifies the modulation format to a configuration controller 78, the purpose of which is to select from a configuration RAM 80 the appropriate demodulation mode to be downloaded to demodulator 84.

In one embodiment, demodulator 84 is provided with a an array of gates, arithmetic logic units or ALUs, registers and other circuit blocks, elements or modules which can be connected together to provide a circuit to recover the associated carrier. In a preferred embodiment, at a higher level, the demodulator is configured in layers, with each layer containing gates and logic as well as filtering to provide a circuit specially tailored for carrier recovery of a different modulation format type. The configuration RAM therefore merely selects which of the layers is to be activated, thereby, taking advantage of the embedded logic in each of the layers.

In a VLSI realization of the universal modem, the universal modem hardware is realized in a VLSI chip, using the logic implemented with DRAM technology and hardware-software codesign. In one embodiment, the communication between the configuration control and the host processor is provided by an I²C bus. The configuration RAM can be implemented with either DRAM- or SDRAM technology, with the latter ensuring faster execution, which is desirable if the amount of data to be stored is very large.

Put another way, the building blocks, elements or modules within the demodulator are quite similar across the entire spectrum of modulation formats. This being the case, these blocks, elements or modules are capable of being connected together in a different manner for each of the modulation types. Thus, the configuration RAM 80 instructs demodulator 84 as to how it is to be reconfigured for the particular modulation type.

As mentioned hereinbefore, for over-the-air applications, the output of demodulator 84 is coupled to an equalizer 86 which, in one application, is utilized for ghost cancellation or to reject intersymbol interference. The output of equalizer 86 is coupled to a Trellis Decoder 88, the purpose of which is to eliminate errors in the bit level of the incoming signal, whereas a Reed-Solomon Decoder 90 is utilized to remove byte level errors. The output of decoder 90 is coupled to I/O 92 which forms the output of the demodulation section of the subject universal modem.

Figure 5B:
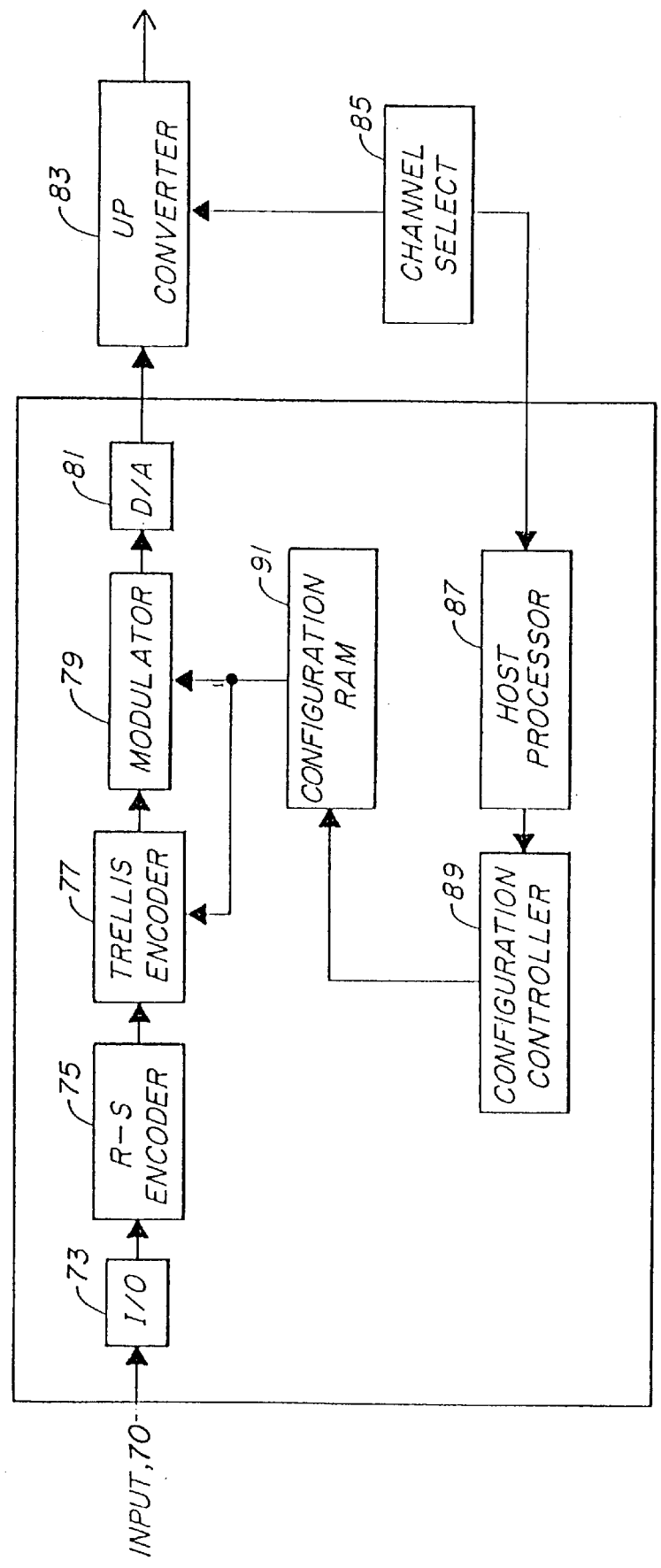
FIG. 5B is a block diagram of one embodiment of the transmit side of the subject universal modem indicating the use of a configuration controller coupled to a configuration RAM in which the modulation format is set in accordance with the desired transmit channel.

Referring now to FIG. 5B, on the transmit side, the universal modem, in one embodiment, has an input 71 coupled to an I/O stage 73, which is in turn coupled to an R-S encoder 75. This encoder is in turn coupled to a Trellis encoder 77 which is then coupled to a software-configurable modulator 79. The output of modulator 79 is coupled to a digital-to-analog converter 81 and thence to an UP converter 83 under the control of a channel select unit 85. The channel assigned to the transmitted signal is selected and the output of D/A converter 81 is upconverted to the appropriate carrier frequency.

As mentioned before, the modulation type or format is correlatable to the transmit channel. The software-configurable modulator is set in accordance with the selected channel by use of a host processor 87 which reads out channel select 85. Host processor 87 outputs the channel to a configuration controller 89 which drives a configuration RAM 91 to configure modulator 79 to the appropriate format. Configuration RAM 91 also sets Trellis encoder 77 to the appropriate channel.

In this way, the modulation section of the universal modem is software-configurable to a predetermined format, in one instance, correlated to the transmit channel. The software-configurable modulator is then quite flexible.

Figure 6:
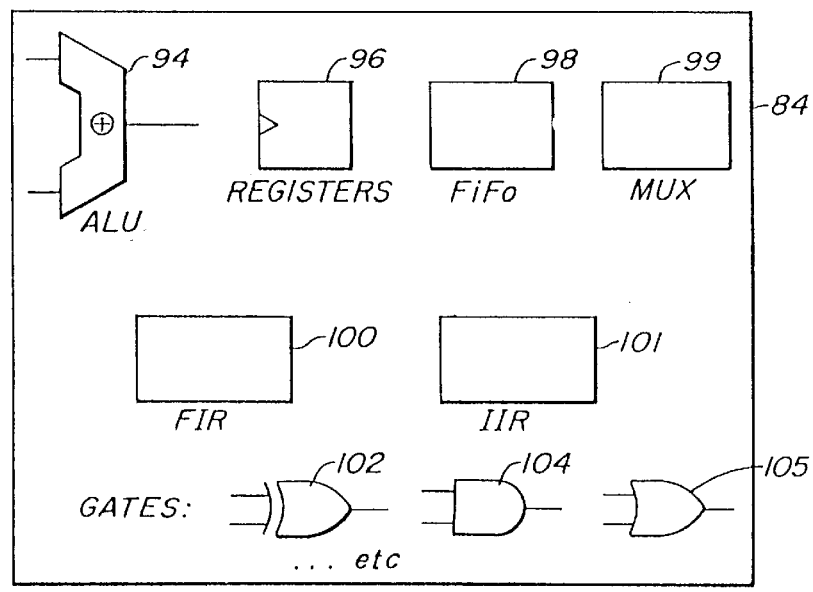
FIG. 6 is a diagrammatic representation of the configurable demodulator of FIG. 5A.

Referring now to FIG. 6, demodulator 84 typically includes blocks, elements or modules such as arithmetic logic unit 94, a number of registers 96, at least one First-In-First-Out or FIFO memory 98, multiplexers 99, one or more finite impulse response filters 100, and one or more infinite impulse response filters 101 as well as numerous gates 102, 104 and 105 which may be NOR gates, AND gates, OR gates or any of the typical logic level devices.

It is the purpose of the demodulator to extract carrier and timing information. How this is accomplished is in major part due to the particular type of finite impulse response filter employed. The combination of ALU registers, FIFO's, multiplexers, and gates as well as finite impulse response and infinite impulse response filters is that which successfully demodulates the signal, with interconnection of these devices being under the control of configuration RAM 80 of FIG. 5A.

Figure 7:
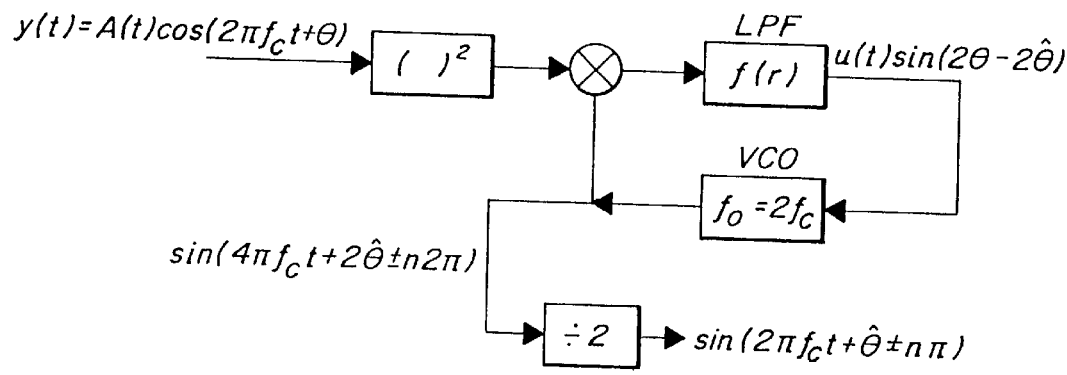
FIG. 7 is a schematic diagram of a typical squaring/phase locked loop carrier recovery system to which the demodulator of FIG. 5A can be configured.

Referring now to FIG. 7, a typical squaring loop carrier recovery system is illustrated in which the functions performed by the low pass filter and the voltage control oscillator as well as the divide-by-two circuit, the mixer and the squaring circuit can be replicated in a single reconfigurable chip so that all of these blocks can be connected together on the fly.

Figure 8:
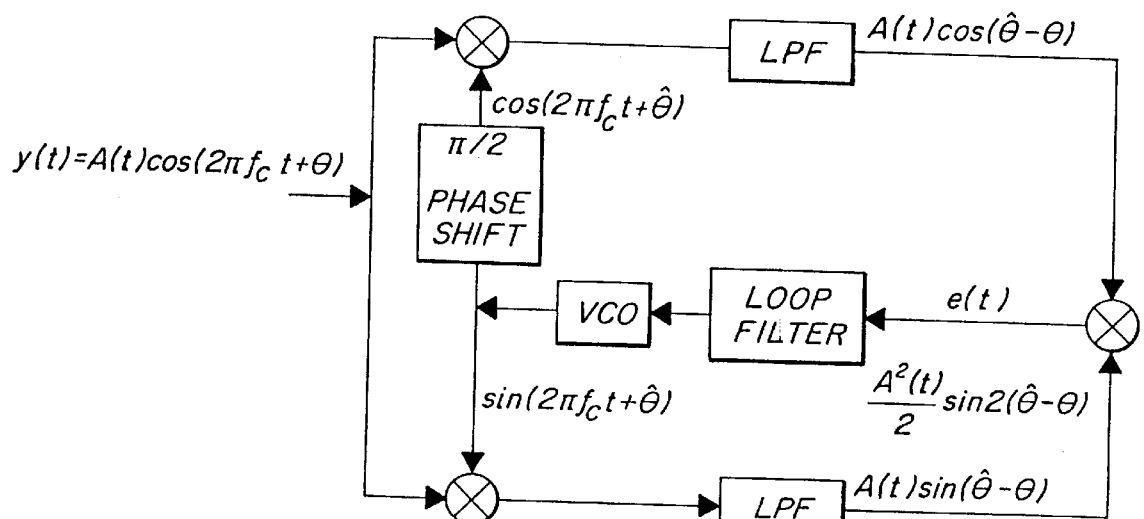
FIG. 8 is a schematic diagram of a typical Costas loop carrier recovery system to which the demodulator of FIG. 5A can be configured.

Referring now to FIG. 8, likewise in Costas loop carrier recovery, the phase shifter, low pass filter, VCO, loop filter as well as the mixer elements are available as blocks in the demodulator which, when connected as illustrated, provides for the carrier recovery functions. Note, this circuit is a typical Costas loop device for tracking the phase of a double-sided suppressed-carrier signal which is equivalent to the squarer/Phase Lock Loop System of FIG. 7.

Referring now to FIG. 9, this drawing shows an embodiment of the demodulation algorithm for demodulator 84 of FIG. 5A for demodulating QPSK/QAM signals. It will be appreciated that this algorithm can be broken down into elements or blocks which form demodulator 84 in FIG. 5A. However, this algorithm can also be implemented in software such that the demodulator is software-configurable. Moreover, equalizer 86, Trellis decoder 88 and R-S decoder 90 can be implemented in software and appropriately configured. Note that an advantage of the software implementation is flexibility.

Figure 10:
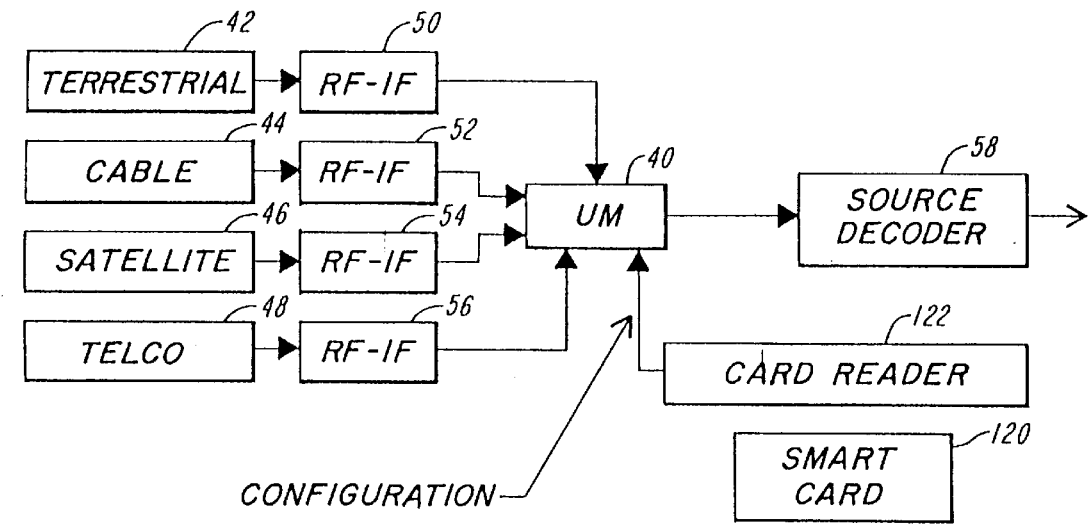
FIG. 10 is a block diagram of a smart card system for setting the software configurable logic unit of the demodulator of FIG. 3; and, FIG. 11 is a block diagram of a system for detecting modulation type based on an error signal which is the result of demodulating all possible modulation types.

As to further systems for setting modulation type or format, and referring now to FIG. 10, it is possible to configure universal modulator 40 utilizing a so-called "smart card" 120 and a card reader 122. In this embodiment, the card has a priori knowledge of the modulator type or format expected and is used to set the software-configurable logic in the modem. This eliminates the necessity of detecting modulation type or format while at the same time offering a billing function, since the use of the smart card and its embedded information can be detected.

Figure 11:
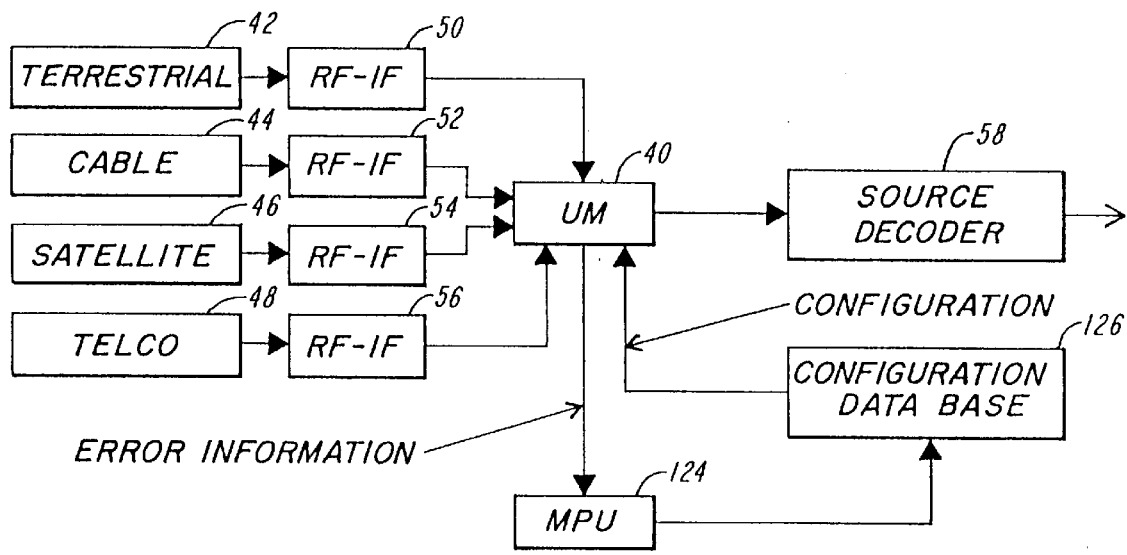

Referring now to FIG. 11, it is also possible to detect modulation type or format through initially demodulating all modulation types, detecting the error at MPU 124 and using a configuration database 126 to change the software-configurable logic to that modulation type or format having the lowest error. Note that initial multiple modulation type demodulation can be in parallel or serial.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A universal modem to accommodate different modulation formats for use in the modulation and demodulation of a signal, comprising:

a modulator and demodulator having software-configurable logic means for providing modulation and demodulation of a signal, said software configurable logic means including functional hardware blocks, each performing a predetermined function, and means for selectively interconnecting said hardware blocks;

means for generating, as an output, configuration instructions for said software-configurable logic means; and, means for coupling said output to said software configurable logic means to configure said modem for the modulation format specified by said configuration instructions by interconnecting said hardware blocks to correspond to said instructions.

2. A universal modem to accommodate different modulation formats for use in the modulation and demodulation of a signal comprising:

a modulator and demodulator, said demodulator having software-configurable logic means for providing demodulation of a signal having a predetermined modulation format, said software configurable logic means including functional hardware blocks, each performing a predetermined function, and means for selectively interconnecting said hardware blocks;

means for ascertaining the modulation type of said signal and for generating, as an output, configuration instructions for said software-configurable logic means; and means for coupling said output to said software configurable logic means, thereby to configure said demodulator for said modulation format by interconnecting said hardware blocks to correspond to said instructions.

3. The modem of claim 2, wherein said software-configurable logic means includes a number of elements, each performing a different demodulation function, and means for interconnecting said elements to perform demodulation of said signal in accordance with said configuration instructions.

4. The modem of claim 3, wherein said elements are taken from the group consisting of arithmetic logic units, registers, fifo buffers, gates, finite impulse response filters and infinite impulse response filters.

5. The modem of claim 2, wherein said modulator includes said software-configurable logic means;

software for configuring said software-configurable logic means to modulate a signal with a predetermined modulation format based on the configuration specified by said software; and, means for running said software to configure said software-configurable logic means.

6. The modem of claim 2 wherein said demodulator includes a software-configurable equalizer and wherein said coupling means includes means for coupling said configuration instructions to said equalizer.

7. Apparatus to accommodate different modulation formats for use in the demodulation of a signal, comprising;

a demodulator having software-configurable logic means for providing demodulation of a signal having a predetermined modulation format, said software configurable logic means including functional hardware blocks, each performing a predetermined function, and means for selectively interconnecting said hardware blocks;

means for ascertaining the modulation format of said signal and for generating, as an output, configuration instructions for said software-configurable logic means; and, means for coupling said output to said software configurable logic means, thereby to configure said demodulator for said modulation format by interconnecting said hardware blocks to correspond to said instructions.

8. The apparatus of claim 7, wherein said software-configurable logic means includes a number of elements, each performing a different demodulation function, and means for interconnecting said elements to perform demodulation of said signal in accordance with said configuration instructions.

9. The apparatus of claim 8, wherein said elements are taken from the group consisting of arithmetic logic units, registers, fifo buffers, gates, finite impulse response filters and infinite impulse response filters.

10. Apparatus to accommodate different modulation formats for use in the modulation of a signal, comprising:

a modulator having software-configurable logic means for providing a modulation format for said signal based on the configuration of said logic means, said software configurable logic means including functional hardware blocks, each performing a predetermined function, and means for selectively interconnecting said hardware blocks;

means for setting the modulation format for said signal by generating as an output configuration instructions for said software-configurable logic means; and, means for coupling said output to said software configurable logic means, thereby to configure said modulator for the modulation format set by interconnecting said hardware blocks to correspond to said instructions.

11. The apparatus of claim 10, wherein said software-configurable logic means includes a number of elements, each performing a different modulation function, and means for interconnecting said elements to perform modulation of said signal in accordance with said configuration instructions.

12. The apparatus of claim 11, wherein said elements are taken from the group consisting of arithmetic logic units, registers, fifo buffers, gates, finite impulse response filters and infinite impulse response filters.

13. In a receiving device adapted to receive signals of different modulation formats, a demodulator having a software-configurable logic unit, said software configurable logic unit including functional hardware blocks, each performing a predetermined function, and means for selectively interconnecting said hardware blocks, said demodulator being coupled to the output of said receiver; and a computer for configuring said software-configurable logic unit with configuration instructions such that said demodulator is set to demodulate a signal having a predetermined modulation format by interconnecting said hardware blocks to correspond to said instructions.

14. The receiving device of claim 13 wherein said receiving device has a channel selector and further including a channel detector having as an output the channel to which said channel selector is set, means for coupling the output of said channel detector to said computer and means within said computer for setting said predetermined modulation type to that expected for signals on the detected channel.

15. The receiving device of claim 13 and further including a flag on the signal received at said receiving device, said flag indicating modulation format, a flag detector having as an output the modulation format of said received signal, and means with said computer for setting said predetermined modulation type to that indicated by the output of said flag detector.

16. The receiving device of claim 13 and further including a smart card and a smart card reader, said smart card having a code specifying the modulation format of a signal to be received by said receiving device, said smart card reader having an output coupled to said computer containing said code and means within said computer for reading said code and setting said predetermined modulation type to that corresponding to said code.

17. In a receiving device adapted to receive signals of different modulation formats, a demodulator having a software-configurable logic unit, said demodulator being coupled to the output of said receiver; and a computer for configuring said software-configurable logic unit such that said demodulator is set to demodulate a signal having a predetermined modulation format, said demodulator initially demodulating all expected modulation types and further including an error signal generator coupled to the output of said demodulator for generating an error signal, a detector for detecting for which modulation format said error signal is at a minimum after said demodulator demodulates all expected modulation formats and means within said computer for setting said predetermined modulation type to that modulation type having said minimum error signal.

18. Apparatus to accommodate different modulation formats for use in the demodulation of a signal received on an input, comprising:

a control signal:
  a demodulator having software configurable logic including functional hardware blocks, each performing a predetermined function, and selective interconnection of said hardware blocks, said demodulator employing different demodulator formats in terms of the interconnection of said hardware blocks, said demodulator coupled to said input and providing demodulation of said signal having a predetermined format based on said control signal with said control signal specifying said interconnection:

a detector coupled to said input and generating as an output different instructions for different demodulation formats based on the detected demodulation format; and, a memory coupled between said demodulator and said detector for storing configuration data, said memory supplying said configuration data to said demodulator as said control signal to activate one of said different demodulation formats.

* * * * *